United States Patent
Kim et al.

(10) Patent No.: US 9,858,211 B2
(45) Date of Patent: Jan. 2, 2018

(54) IN-VEHICLE MULTIMEDIA TERMINAL, CONTROL METHOD THEREOF, AND RECORDING MEDIUM

(71) Applicant: HYUNDAI MOTOR COMPANY, Seoul (KR)

(72) Inventors: Hyung Jin Kim, Incheon (KR); Dong Hyub Kang, Yongin-si (KR); Sang Yong Jung, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 273 days.

(21) Appl. No.: 14/731,026

(22) Filed: Jun. 4, 2015

(65) Prior Publication Data

US 2016/0170913 A1    Jun. 16, 2016

(30) Foreign Application Priority Data

Dec. 11, 2014  (KR) .................. 10-2014-0178443

(51) Int. Cl.
```
G06F 3/00      (2006.01)
G06F 13/10     (2006.01)
H04W 4/16      (2009.01)
H04W 76/02     (2009.01)
```

(52) U.S. Cl.
CPC ............ *G06F 13/102* (2013.01); *H04W 4/16* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 2003/0004897 A1* | 1/2003 | Smith, IV | G06F 17/30867 705/76 |
| 2004/0210479 A1* | 10/2004 | Perkowski | G06Q 30/02 705/14.51 |
| 2011/0098056 A1* | 4/2011 | Rhoads | G01C 21/20 455/456.1 |

(Continued)

FOREIGN PATENT DOCUMENTS

| | | |
|---|---|---|
| JP | 2014-119917 A | 6/2014 |
| JP | 2014-138360 A | 7/2014 |

(Continued)

OTHER PUBLICATIONS

Korean Office Action issued in Korean Application No. 10-2014-0178443 dated Jul. 29, 2015.

*Primary Examiner* — Michael Sun
(74) *Attorney, Agent, or Firm* — McDermott Will & Emery LLP

(57) ABSTRACT

A control method of an in-vehicle multimedia terminal, the method includes performing communication connection to a mobile terminal. A type of the communication connected mobile terminal and an operating system (OS) installed in the mobile terminal are recognized. A function for automatically searching for a first function is enabled or disabled when the mobile terminal provides the first function. The first function is performed by the in-vehicle multimedia terminal when the automatic search function is enabled. A second function is performed by the in-vehicle multimedia terminal when the automatic search function is disabled.

26 Claims, 7 Drawing Sheets

(56) References Cited

U.S. PATENT DOCUMENTS

| | | | |
|---|---|---|---|
| 2012/0088524 A1* | 4/2012 | Moldavsky | G06Q 30/02 455/456.3 |
| 2012/0245945 A1* | 9/2012 | Miyauchi | G10L 15/06 704/275 |
| 2014/0208252 A1* | 7/2014 | Schubert | G06F 9/4445 715/771 |
| 2016/0006577 A1* | 1/2016 | Logan | H04L 12/2827 700/276 |
| 2016/0087933 A1* | 3/2016 | Johnson | H04W 4/001 709/245 |
| 2016/0300417 A1* | 10/2016 | Hatton | G07C 9/00857 |

FOREIGN PATENT DOCUMENTS

| | | |
|---|---|---|
| KR | 10-2005-0061840 A | 6/2005 |
| KR | 10-2011-0082881 A | 7/2011 |
| KR | 10-2013-0125112 A | 11/2013 |

* cited by examiner

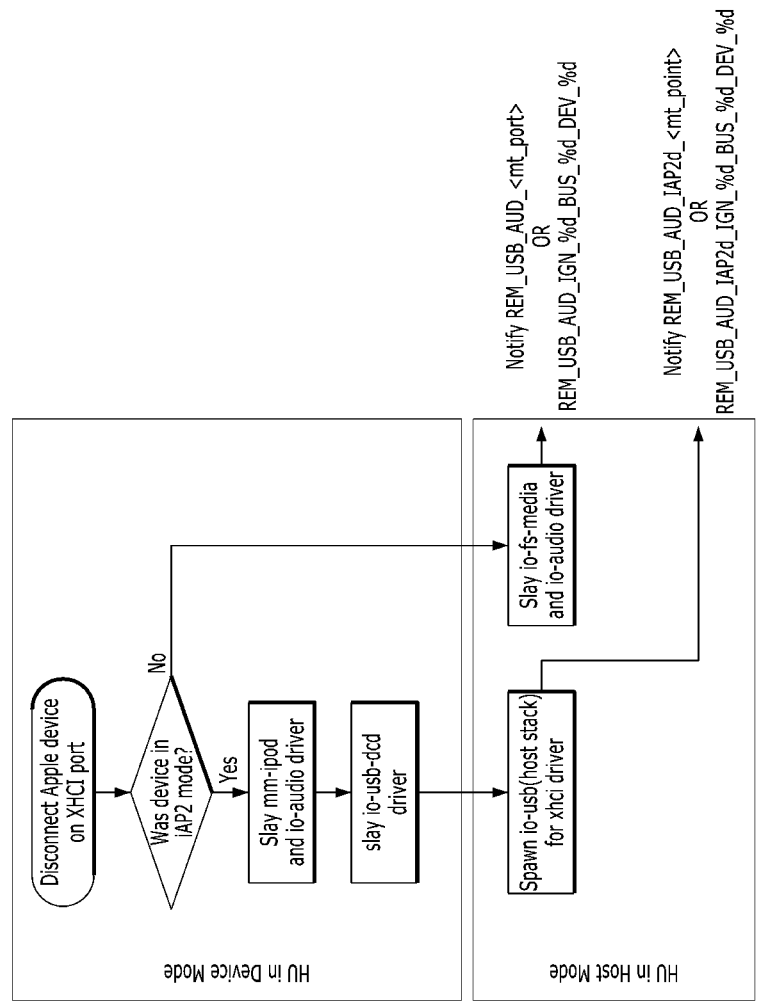

IN-VEHICLE MULTIMEDIA TERMINAL, CONTROL METHOD THEREOF, AND RECORDING MEDIUM

CROSS REFERENCE TO RELATED APPLICATION

This application claims the benefit of priority to Korean Patent Application No. 10-2014-0178443, filed on Dec. 11, 2014, which is hereby incorporated by reference as if fully set forth herein.

TECHNICAL FIELD

The present disclosure relates to an in-vehicle multimedia terminal, a control method thereof, and a recording medium, and more particularly, to an in-vehicle multimedia terminal for user convenience, a control method thereof, and a recording medium.

BACKGROUND

Rapid development of electronic control technology allows a variety of mechanical devices of a vehicle to be electrically driven for user convenience, driving safety, and the like. Accordingly, in-vehicle technology has been continuously improving.

An in-vehicle multimedia terminal may be mounted in the vehicle to provide audio, video, and navigation (AVN) functions. In addition, the in-vehicle multimedia terminal may perform communication with a telematics unit via controller area network (CAN) communication, or may be integrally equipped with the telematics unit.

In addition, the in-vehicle multimedia terminal may be equipped with a display to provide visual information to a user. The in-vehicle multimedia terminal provides a user with a function to guide to a destination.

In addition, with recent development of mobile terminals, the in-vehicle multimedia terminal provides various services via wired/wireless communication with a mobile terminal.

The related art discloses a vehicle convergence technology based on mobile terminal connectivity. When a mobile terminal capable of providing a plurality of services is connected to an AVN terminal, the AVN terminal may automatically provide only one service among the services.

With an increasing use of vehicle multimedia terminal, there is a need to develop the AVN terminal for better user convenience.

SUMMARY

The present disclosure is directed to an in-vehicle multimedia terminal, a control method thereof, and a recording medium that substantially obviate one or more problems due to limitations and disadvantages of the related art.

An aspect of the present inventive concept provides an in-vehicle multimedia terminal capable of selecting services operating via separate protocols upon connection of a mobile terminal capable of providing a plurality of services operating via separate protocols and a control method thereof.

Additional advantages, objects, and features of the disclosure will be set forth in part in the description which follows and in part will become apparent to those having ordinary skill in the art upon examination of the following or may be learned from practice of the disclosure. The objectives and other advantages of the inventive concept may be realized and attained by the structure particularly pointed out in the written description and claims hereof as well as the appended drawings.

According to an exemplary embodiment of the present inventive concept, a control method of an in-vehicle multimedia terminal, the method includes performing communication connection to a mobile terminal. A type of the communication connected mobile terminal and an operating system (OS) installed in the mobile terminal are recognized. A function for automatically searching for a first function is enabled or disabled when the mobile terminal provides the first function. The first function is performed by the in-vehicle multimedia terminal when the automatic search function is enabled. A second function is performed by the in-vehicle multimedia terminal when the automatic search function is disabled.

According to another exemplary embodiment of the present inventive concept, an in-vehicle multimedia terminal includes a display, an interface unit configured to perform communication connection to a mobile terminal. A controller is configured to recognize a type of the communication connected mobile terminal, communication protocol information, other information, and an OS installed in the mobile terminal and to enable or disable a function for automatically searching for a first function when the mobile terminal provides the first function. The controller is configured to perform the first function by the in-vehicle multimedia terminal when the search function is enabled and to perform a second function by the in-vehicle multimedia terminal when the search function is disabled.

A non-transitory computer readable recording medium including a program to execute a control method of an in-vehicle multimedia terminal. The control method comprises recognizing a type of a communication connected mobile terminal and an OS installed in the mobile terminal. A function for automatically searching for a first function is enabled or disabled when the mobile terminal provides the first function. The first function is performed by the in-vehicle multimedia terminal when the search function is enabled. A second function is performed by the in-vehicle multimedia terminal when the search function is disabled.

It is to be understood that both the foregoing general description and the following detailed description of the present inventive concept are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the inventive concept and together with the description serve to explain the principle of the disclosure.

FIG. 7 is a view showing the operation flow of an in-vehicle multimedia terminal upon disconnection of a mobile terminal according to an embodiment of the present inventive concept.

DETAILED DESCRIPTION

Figure 1:
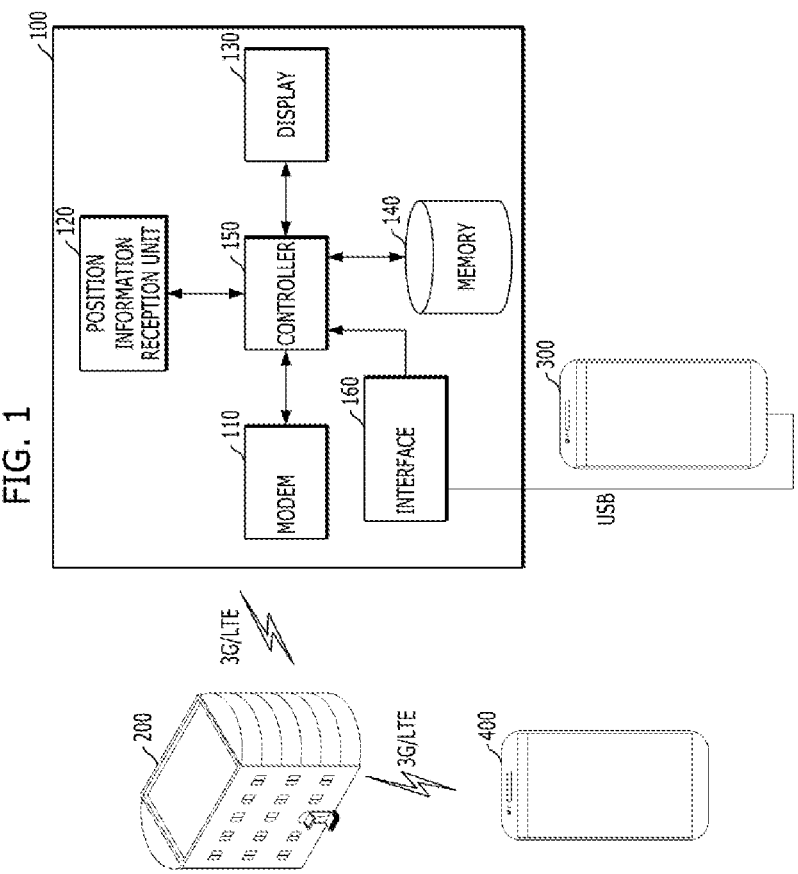
FIG. 1 is a block diagram of an in-vehicle multimedia terminal according to an embodiment of the present inventive concept

Hereinafter, reference will now be made in detail to exemplary embodiments of the present inventive concept, examples of which are illustrated in the accompanying drawings. In the drawings, the same or similar elements are denoted by the same reference numerals even though they are depicted in different drawings, and a detailed description of the same or similar elements will be omitted. The suffixes "module" and "unit" of elements herein are used for convenience of description, and thus can be used interchangeably and do not have any distinguishable meanings or functions. In addition, in the following description of the embodiments disclosed herein, a detailed description of related known technologies will be omitted when it may make the subject matter of the embodiments disclosed herein rather unclear. In addition, the accompanying drawings have been made only for a better understanding of the embodiments disclosed herein and are not intended to limit technical ideas disclosed herein, and it should be understood that the accompanying drawings are intended to encompass all modifications, equivalents, and substitutions included in the spirit and scope of the present inventive concept.

The terms including "first," "second," and the like may be used to describe various elements, but the elements are not limited by the terms. The terms, if any, are used for distinguishing between one element and other elements.

It will be understood that when one element is referred to as being "connected to" or "accessed by" another element, one element may be "connected to" or "accessed by" another element via a further element although one element may be directly connected to or directly accessed by another element. On the other hand, it will be understood that when one element is referred to as being "directly connected to" or "directly accessed by" another element, there is no component between the mentioned elements.

The singular forms are intended to include the plural forms as well, unless the context clearly indicates otherwise.

The term "comprises" or "has" described herein should be interpreted not to exclude presence or addition possibility of characteristics, numbers, steps, operations, constituent elements, parts, or combinations thereof described in the specification but to designate presence of one or more other characteristics, numbers, steps, operations, constituent elements, parts, or combinations thereof.

FIG. 1 is a block diagram of an in-vehicle multimedia terminal according to an embodiment of the present inventive concept.

Referring to FIG. 1, an in-vehicle multimedia terminal 100 may perform communication with a telematics center 200.

The in-vehicle multimedia terminal 100 may include a modem 110, a position information receiver 120, a display 130, a memory 140, a controller 150, and an interface 160.

While the in-vehicle multimedia terminal 100 is described herein as including the modem 110 and the position information receiver 120, in some embodiments, a telematics unit (not shown) including a modem and the position information receiver 120 may be separated from each other. In this case, the telematics unit (not shown) and the position information receiver 120 may communicate with each other via in-vehicle communication, such as controller area network (CAN) communication or media oriented systems transport (MOST) communication. In addition, the multimedia terminal 100 as described herein may include a different number of components than aforementioned components.

The in-vehicle multimedia terminal 100 generally includes the display 130 disposed at a front interior region of a vehicle. In addition, the multimedia terminal 100 provides audio, video, and navigation (AVN) functions.

The modem 110 may include one or more modules to enable wireless communication between the in-vehicle multimedia terminal 100 and a wireless communication system, between the in-vehicle multimedia terminal 100 and another telematics terminal, or between the in-vehicle multimedia terminal 100 and an external center. In addition, the modem 110 may include one or more modules to connect the in-vehicle multimedia terminal 100 to one or more networks. While the modem 110 and the position information receiver 120 have been described separately herein, in some embodiments, the modem 110 and the position information receiver 120 may be incorporated in a telematics unit (not shown).

The modem 110 may perform communication with the telematics center 200. Generally, the modem 110 may perform communication with the telematics center 200 using wireless communication. The modem 110 may transmit and receive radio signals to and from at least one of a base station, an external terminal, and the telematics center 200 via a mobile communication network that is constructed according to technical standards for mobile communication or communication methods (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), and long term evolution-advanced (LTE-A)). The radio signals may include various types of data based on transmission/reception of voice call signals, video call signals, and letters/multimedia messages.

The position information receiver 120 acquires a position (or current position) of the in-vehicle multimedia terminal 100. For example, a position of the in-vehicle multimedia terminal 100 may be acquired as the position information receiver 120 receives singles transmitted from GPS satellites.

The display 130 may include at least one selected from among a liquid crystal display (LCD), a thin film transistor-liquid crystal display (TFT-LCD), an organic light emitting diode (OLED), a flexible display, a three-dimensional (3D) display, and e-ink display.

In addition, two or more displays 130 may be present in some embodiments of the in-vehicle multimedia terminal 100. In this case, the terminal 100 may include plural displays that are spaced apart from one another or integrally arranged in a single plane, or are arranged respectively in different planes.

The display 130 may include a touch sensor to sense a touch to the display 130 so as to receive a control command in a touch manner. As such, upon occurrence of a touch to the display 130, the touch sensor may sense the touch and the controller 150 may generate a control command corresponding to the touch. Content input via touch may be letters or numerals, or menu items that may be indicated or designated in various modes.

The memory 140 stores data to assist various functions of the in-vehicle multimedia terminal 100. The memory 140 may store a number of applications that are driven in the in-vehicle multimedia terminal 100, and data and commands for operation of the in-vehicle multimedia terminal 100. At least some applications may be downloaded from an external center via wireless communication. In addition, at least some applications may be preinstalled in the in-vehicle multimedia terminal 100 for basic functions of the in-vehicle multimedia terminal 100. The applications may be stored in the memory 140 and installed in the in-vehicle multimedia terminal 100 to be driven by the controller 150 to perform the operation (or functions) of the in-vehicle multimedia terminal 100.

The memory 140 may store programs to operate the controller 150, and temporarily store input/output data (e.g., a phonebook, messages, still images, and moving images). The memory 140 may store data related to various patterns of vibrations and sound output upon input of a touch to a touchscreen.

The memory 140 may include at least one storage medium selected from a flash memory memory, a hard disk memory, a solid state disk (SSD) memory, a silicon disk drive (SDD) memory, a multimedia card micro memory, a card memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. The in-vehicle multimedia terminal 100 may be operated in connection with a web storage that performs a storage function of the memory 140 in the Internet.

The interface 160 may perform communication with an external mobile terminal 300. The interface 160 may include a keyboard or a touch panel that enables input of a user, and provide USB communication with the external mobile terminal 300. In addition, the interface 160 may be connected to the external mobile terminal 300 via Bluetooth communication.

In addition, the interface 160 may communicate with the mobile terminal 300 via Wi-Fi, Bluetooth, Wi-Fi direction, or infrared (IR) communication under control of the controller 150. For example, when the interface 160 is connected to a Bluetooth device, the interface 160 may perform data transmission/reception with the Bluetooth device under control of the controller 150.

The controller 150 typically controls general operations of the in-vehicle multimedia terminal 100 in addition to operations related to the applications. The controller 150 may process signals, data, and information input or output via the aforementioned components, or drive applications stored in the memory 140, thereby providing or processing information or functions suitable for the user.

The controller 150 may receive current position information of a telematics terminal via the position information receiver 120. The current position information may be acquired via GPS reception.

In addition, the in-vehicle multimedia terminal 100 may include an audio module (not shown) to provide audio information.

The telematics center 200 may communicate with the mobile terminal 300 (e.g., a 3G/LTE terminal). The telematics sensor 200 may transmit information received from the mobile terminal 300 to the multimedia terminal 100.

Figure 2:
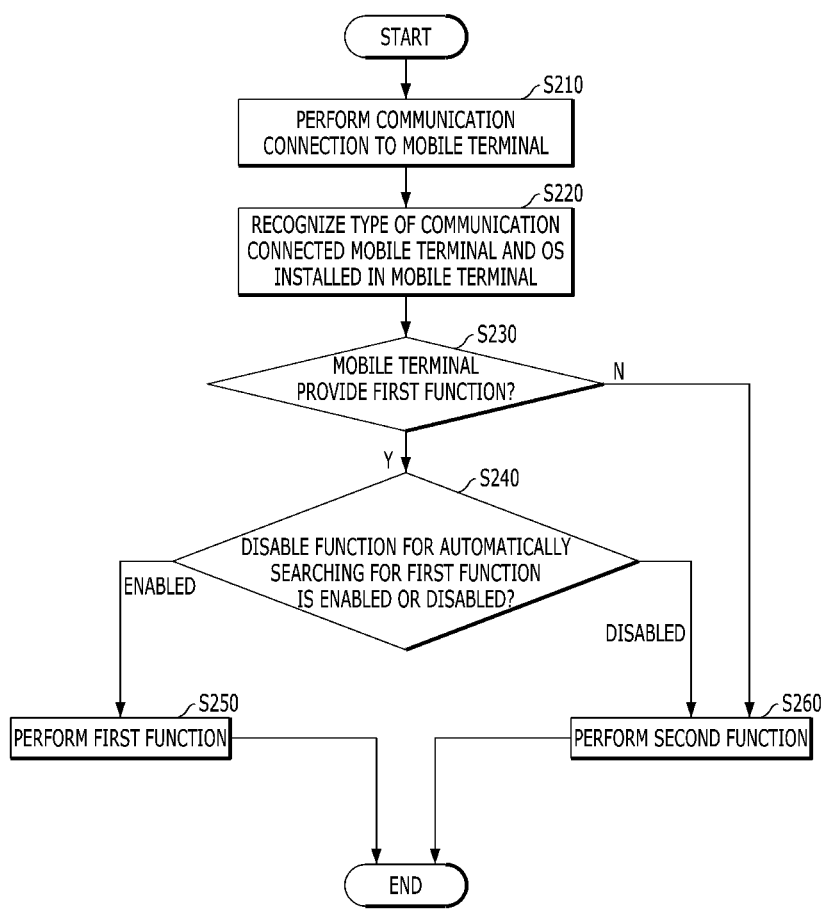
FIG. 2 is a sequence view showing a control method of an in-vehicle multimedia terminal according to an embodiment of the present inventive concept

FIG. 2 is a sequence view of a control method of an in-vehicle multimedia terminal according to an embodiment of the present inventive concept.

First, the controller 150 performs communication with the mobile terminal 300 through the interface 160 (S210).

The controller 150 may communicate with the mobile terminal 300 via wired communication, such as USB or serial communication. In addition, the controller 150 may communicate with the mobile terminal 300 via wireless communication, such as Bluetooth, Wi-Fi, or Wi-Fi direct communication.

For convenience of implementation, the controller 150 may set wireless communication, such as Bluetooth communication, to be disabled in a case of USB connection of the mobile terminal 300.

Next, the controller 150 recognizes a kind of the communication connected mobile terminal 300, a communication protocol version, other information, and an operating system (OS) installed in the mobile terminal 300 (S220).

More specifically, the controller 150 may recognize a vendor ID, terminal information, and OS version information of the mobile terminal 300. On one example, when the mobile terminal 300 is Apple's iPhone, the controller 150 may receive Apple's vendor ID, terminal information (e.g., iPhone 6), and installed OS information (e.g., iOS version 8) from the mobile terminal 300. In another example, when the mobile terminal is a Samsung's phone, the controller 150 may receive Samsung's vendor ID, terminal information (e.g., Galaxy Note 4), and installed OS information (e.g., Android version 4.3) from the mobile terminal 300. For example, a vendor ID is 0x05AC and a terminal ID is 0x12NN. The controller 150 may receive various information except the aforementioned information from the mobile terminal 300. In one example, when the mobile terminal 300 is an iPhone, the controller 150 may recognize whether the mobile terminal 300 supports Apple Accessory Protocol 2 (iAP2) for a CarPlay function or Apple Accessory Protocol 1 (iAP1) for a Pandora function or iHeart Radio function that is developed as an iAP1-based application. Here, iAP2 corresponds to a protocol that is usable starting from iOS version 7.1. iAP1 corresponds to a protocol that is provided in an iPhone before installation of iAP2. Such iAP1 is used in an Apple's portable media player such as iPod.

Here, the iAP1-based application (e.g., Pandora) may be supported later as an iAP2-based application.

In another example, when the mobile terminal 300 runs Android OS, the controller 150 may recognize whether the mobile terminal 300 provides an Android Auto function. The Android Auto function may be similar to a CarPlay function of iOS.

Thereafter, when the mobile terminal 300 provides a first function (S230), the controller 150 enables or disables a function for automatically searching for the first function (S240).

Here, the first function may include a CarPlay function supported by iAP2. The CarPlay function is a function for transmitting content of an iPhone to the in-vehicle multimedia terminal 100. The controller 150, which has received multimedia data from the iPhone, may provide a multimedia service by performing signal processing. It may be possible to manipulate content in the in-vehicle multimedia terminal 100. In this case, the controller 150 may display multimedia interworking function information through the display 130 by processing data received from the mobile terminal 300. For example, the controller 150 may receive multimedia content to display the corresponding content on the display 130. In addition, the controller 150 may output audio content by processing received data. In addition, the controller 150 may receive navigation content to output the content through the display 130.

The controller 150 may enable or disable a function for automatically searching for the CarPlay function (S240).

When the controller 150 enables a function for automatically searching for the CarPlay function and the mobile terminal 300 is capable of providing the CarPlay function, the controller 150 may be operated to directly perform the CarPlay function.

However, when the controller 150 disables a function for automatically searching for the CarPlay function, the controller 150 may not be operated to directly perform the CarPlay function even if the mobile terminal 300 is capable of providing the CarPlay function. In the related art, the controller 150 is configured to directly perform the CarPlay function when the mobile terminal 300 supports the CarPlay function, which causes a second function providable by iAP1 to be inoperative, resulting in user inconvenience. The present disclosure may prevent this user inconvenience.

Here, the CarPlay function, executed in the in-vehicle multimedia terminal 100, may include a function for receiving and serving content of the mobile terminal 300. The controller 150 may receive a multimedia navigation service performed in the mobile terminal 300 to display the same on the display 130.

At this time, when the controller 150 receives a user control command, the control command may be directly executed in the in-vehicle multimedia terminal 100 and may be transmitted to the mobile terminal 300 so as to be executed in the mobile terminal 300.

When the controller 150 disables the CarPlay function, the controller 150 may perform the second function (S260).

Here, the second function may be a function based on iAP1 that is provided in an OS before iOS version 7.1 or is used in iPod. An OS version after iOS version 7.1 supports the first function (CarPlay function using iAP2) and the second function (using iAP1).

In this case, the controller 150 may enable and launch various applications. For example, the controller 150 may launch an application, such as Pandora. In the related art, the controller 150 is configured to directly provide the first function (CarPlay function) so long as the first function can be provided by the mobile terminal 300, which deprives a user of the chance of using an application, such as Pandora or aha Radio.

The controller 150 may perform the second function when the mobile terminal does not provide the first function and the controller 150 enables a function for automatically searching for the first function.

In addition, when the mobile terminal can service the first function (CarPlay function) and the second function (iPod function) and the controller 150 disables a function for automatically searching for the first function, the controller 150 may perform the second function (iPod function) through the in-vehicle multimedia terminal 100.

The controller 150 may ask whether to select the first function or the second function in response to a user input. This process may be performed through a set user interface (UI) screen as shown in FIG. 3.

Figure 3:
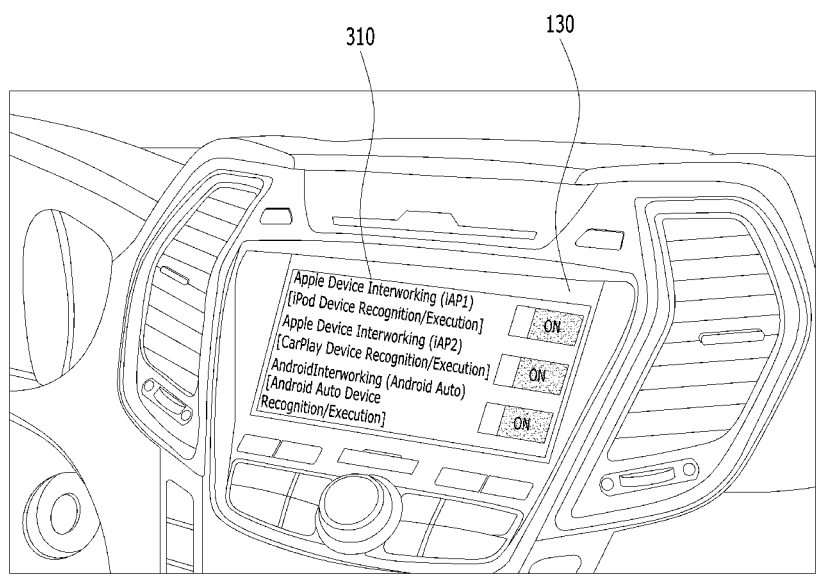
FIG. 3 is a view showing a user interface (UI) screen to enable selection of a single service among a plurality of services operating via separate protocols according to an embodiment of the present inventive concept.

FIG. 3 is a view showing a UI screen to enable selection of a single service among a plurality of services operating via separate protocols according to an embodiment of the present inventive concept.

Referring to FIG. 3, the controller 150 may display a set UI screen 310 on the display 130. Upon selection of an item "iAP2<CarPlay Device Recognition/Execution>" to enable the first function, the controller 150 may enable the first function.

When the item "iAP2<CarPlay Device Recognition/Execution>" is not selected, the controller 150 may enable the second function (corresponding to an item "iAP1<iPod device recognition/execution").

Note that the controller 150 may enable the second function when the first function is not enabled.

In addition, the controller 150 may also display an item "Android Auto Device Recognition/Execution" that interworks with Android OS (this item corresponds to a third function).

The controller 150 may display additional items to perform various functions except for the first to third functions as described above.

The following table is a table that shows whether or not to execute an interworking service according to setting of the in-vehicle multimedia terminal 100 and the external mobile terminal 300. For example, when the controller 150 turns ON a specific function and the mobile terminal turns ON the specific function, an interworking service may be executed. That is, when the controller 150 and the mobile terminal 300 set the CarPlay function, the controller 150 may perform CarPlay operation.

In this case, the controller 150 may provide the user with an announcement/notification function with respect to such an interworking state through the display 130.

In addition, when the controller 150 sets the CarPlay function and the mobile terminal 300 does not set the CarPlay function, the controller 150 may provide a service using iAP1 instead of the CarPlay function. The controller 150 may additionally provide a user announcement/user notification to notify the user that an application, such as Pandora or aha Radio, can be executed.

TABLE 1

| Number of Case | In-vehicle multimedia terminal setting | Mobile terminal setting | Operation(additionally providing user announcement/user notification) |
|---|---|---|---|
| 1 | Corresponding function ON | Corresponding function ON | Execution of service |
| 2 | Corresponding function ON | Corresponding function OFF | Non-execution of service |
| 3 | Corresponding function OFF | Corresponding function ON | Non-Execution of service |
| 4 | Corresponding function OFF | Corresponding function OFF | Non-Execution of service |

Here, the corresponding function is not limited to an iOS function and may be a function provided by Android OS or Tyron OS.

Figure 4:
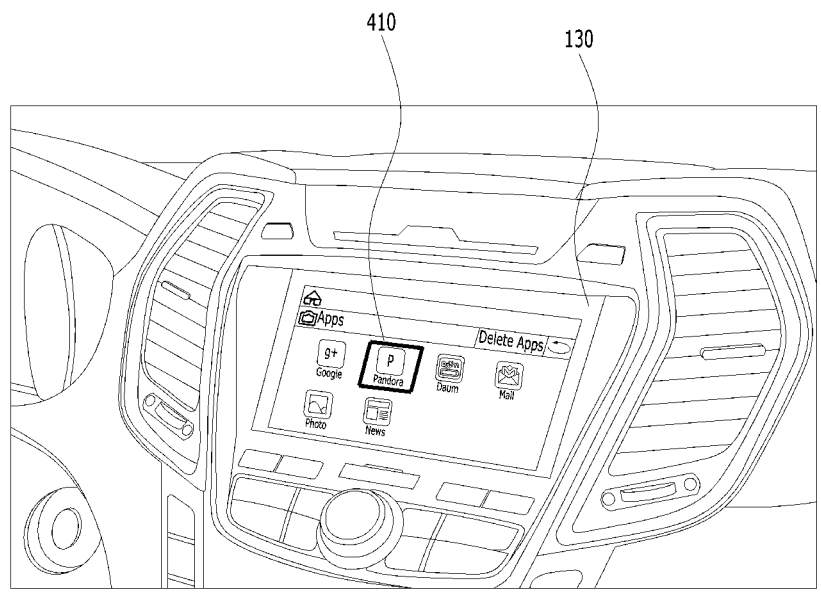
FIG. 4 is a view showing an execution screen of a second function of an in-vehicle multimedia terminal according to an embodiment of the present inventive concept.

FIG. 4 is a view showing an execution screen of a second function of an in-vehicle multimedia terminal according to an embodiment of the present inventive concept.

Referring to FIG. 4, when the first selection is not selected, the controller 150 may display a list of applications related to the second function on the display 130.

The controller 150 provides a list of applications that are currently provided by iAP1. The controller 150 may display items for provision of Pandora 410, aha Radio, and SNS.

Figure 5:
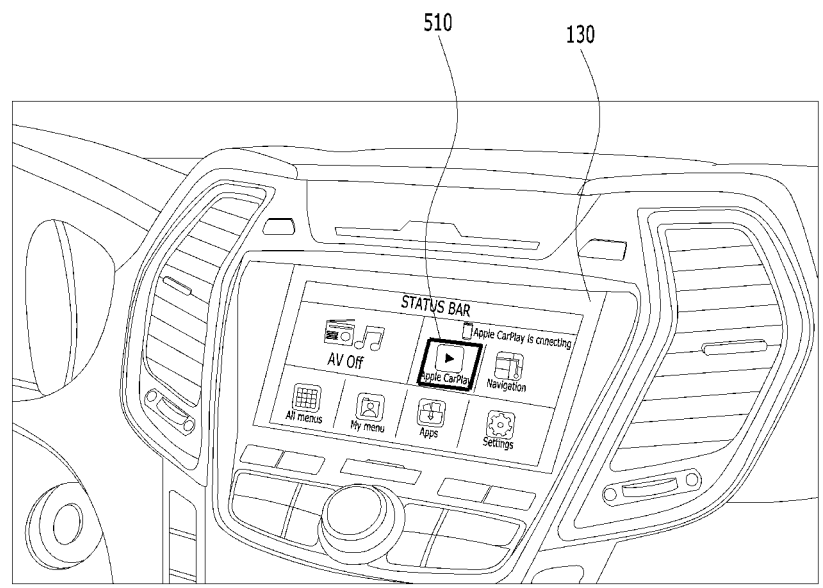
FIG. 5 is a view showing an execution screen of a first function of an in-vehicle multimedia terminal according to an embodiment of the present inventive concept.

FIG. 5 is a view showing an execution screen of a first function of an in-vehicle multimedia terminal according to an embodiment of the present inventive concept.

The controller 150 may provide a CarPlay service 510 and a navigation service.

Figure 6:
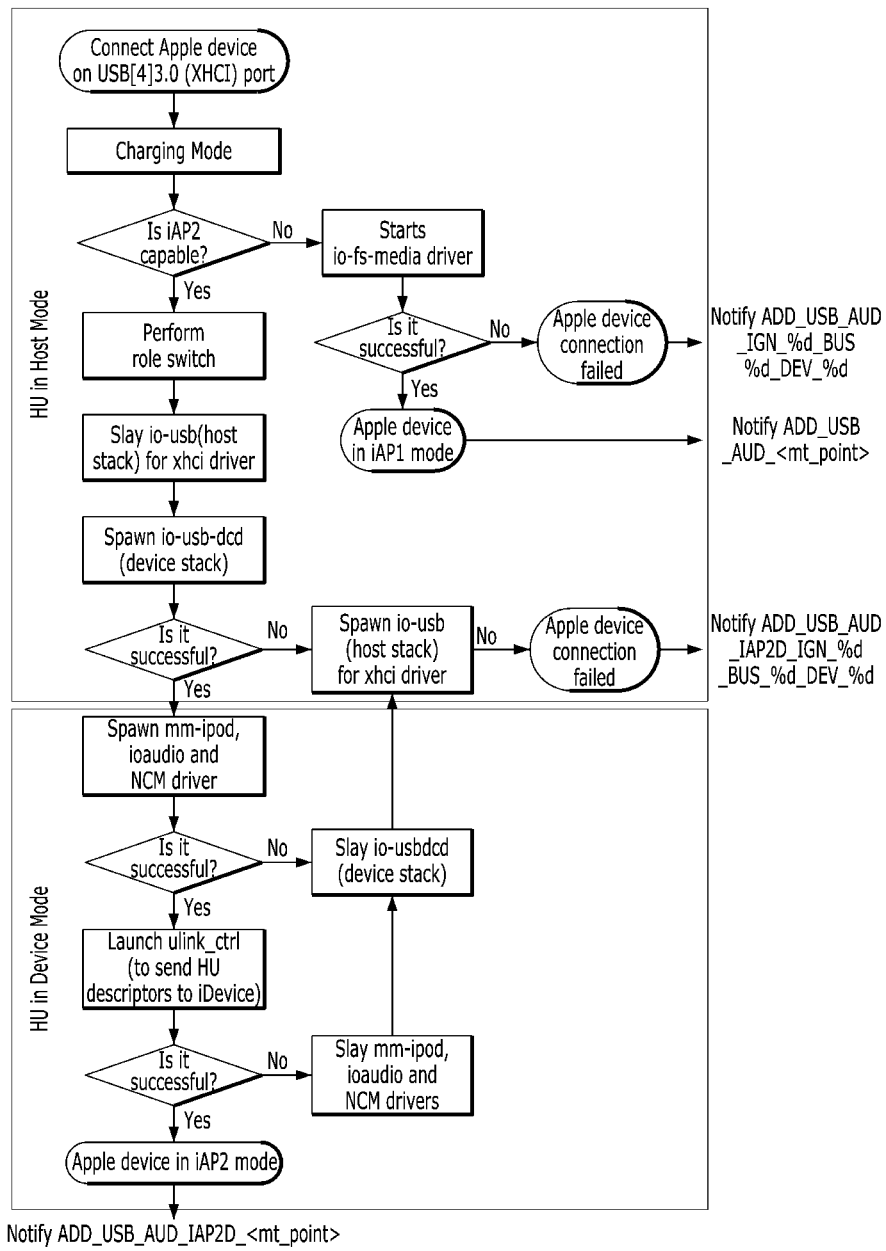
FIG. 6 is a view showing the operation flow of an in-vehicle multimedia terminal upon connection of a mobile terminal according to an embodiment of the present inventive concept.

FIG. 6 is a view showing an operation flow of an in-vehicle multimedia terminal upon connection of a mobile terminal according to an embodiment of the present inventive concept.

Referring to FIG. 6, the controller 150 determines whether or not to enable the CarPlay function according to whether iAP2 is settable.

FIG. 7 is a view showing an operation flow of an in-vehicle multimedia terminal upon disconnection of a mobile terminal according to an embodiment of the present inventive concept.

In another embodiment of the present inventive concept, when the AVN terminal 100 is primarily connected to a USB device to play back music and then secondarily connected to a Bluetooth device to play back music via Bluetooth connection and thereafter thirdly connected again to the USB device to play back music, malfunction of an interworking function with the thirdly connected USB device may occur due to a Bluetooth connection command (AVRCP Playback).

This problem may be solved by the following two methods. In a first method, upon switching from Bluetooth connection to USB connection, Bluetooth connection is released before USB playback and is re-executed after execution of USB playback. In this case, both USB connection and Bluetooth connection are applied to a single device. In a second method, upon switching from a playback mode by Bluetooth connection to a playback mode by USB connection, only one connection is maintained to provide a playback function. Bluetooth connection is not performed during USB connection. Alternatively, when USB connection is attempted (performed) by the same device during Bluetooth connection, Bluetooth connection is automatically released and a service is performed via USB connection.

In addition, the in-vehicle multimedia terminal 100 may disable content provided upon Bluetooth connection when the in-vehicle multimedia terminal 100 is connected to the mobile terminal 300 via USB communication. In particular, the in-vehicle multimedia terminal 100 may not display corresponding content on a display screen.

In a computer readable recording medium including a program to execute the control method of a multimedia terminal according to one embodiment of the present inventive concept, the control method may include performing communication connection to a mobile terminal, recognizing a type of the communication connected mobile terminal and an operating system (OS) installed in the mobile terminal, enabling or disabling a function for automatically searching for a first function when the mobile terminal provides the first function, performing the first function by the in-vehicle multimedia terminal when the search function is enabled, and performing a second function by the in-vehicle multimedia terminal when the search function is disabled.

The computer readable medium includes all kinds of recording devices in which data that may be read by a computer system is stored. Examples of the computer readable medium may include a hard disk drive (HDD), a solid state disk (SSD), a silicon disk drive (SDD), ROM, a RAM, a CD-ROM, a magnetic tape, a floppy disk, and an optical data storage device. In addition, the computer readable recording medium includes a carrier wave (e.g., data transmission over the Internet). In addition, the computer may include the controller 150 of the terminal. Accordingly, the above detailed description is not intended to be construed to limit the present disclosure in all aspects and be considered by way of example. The scope of the present inventive concept should be determined by reasonable interpretation of the accompanying claims and all equivalent modifications made without departing from the present disclosure should be included in the following claims.

As is apparent from the above description, according to various embodiments of the present inventive concept, upon connection of a mobile terminal capable of providing a plurality of services operating via separate protocols, an in-vehicle multimedia terminal is capable of selecting services operating via separate protocols, which may result in enhanced user convenience.

It will be appreciated by persons skilled in the art that the effects that can be achieved through the present disclosure are not limited to what has been particularly described hereinabove and other advantages of the present disclosure will be more clearly understood from the above detailed description.

It will be apparent to those skilled in the art that various modifications and variations can be made in the present disclosure without departing from the spirit or scope of the invention. Thus, it is intended that the present disclosure covers the modifications and variations of this disclosure provided they come within the scope of the appended claims and their equivalents.

What is claimed is:

1. A control method of an in-vehicle multimedia terminal, the method comprising steps of:
performing communication connection to a mobile terminal providing a plurality of services operating via separate protocols and an operating system (OS);
recognizing a type of the communication connected mobile terminal and the operating system (OS) installed in the mobile terminal;
enabling or disabling a function for automatically searching for a first function associated with one of the plurality of services operating and the type of the communication connected mobile terminal when the mobile terminal provides the first function;
performing the first function by the in-vehicle multimedia terminal when the automatic search function is enabled; and
performing, by the in-vehicle multimedia terminal when the automatic search function is disabled, a second function associated with another one of the plurality of services operating and the type of the communication connected mobile terminal,
wherein the type of the communication connected mobile terminal is recognized by considering a vendor ID of the mobile terminal, device information of the mobile terminal, OS version information, and communication protocol information.

2. The control method according to claim 1, wherein the step of performing the communication connection includes performing the communication connection to the mobile terminal via universal serial bus (USB) or Bluetooth.

3. The control method according to claim 1, further comprising performing the second function by the in-vehicle multimedia terminal when the mobile terminal does not provide the first function and the multimedia terminal enables the function for automatically searching for the first function.

4. The control method according to claim 1, further comprising performing the second function by the in-vehicle multimedia terminal when the mobile terminal does not provide the first function and the multimedia terminal disables the function for automatically searching for the first function.

5. The control method according to claim 1, wherein the step of enabling or disabling includes enabling the first function upon selection of a first function enabling item displayed on a user interface (UI) setting screen and disabling the first function upon non-selection of the first function enabling item displayed on the user interface (UI) setting screen.

6. The control method according to claim 1, wherein the step of performing the first function includes performing the first function, provided in the first mobile terminal, by the in-vehicle multimedia terminal.

7. The control method according to claim 1, wherein the step of performing the second function includes:
displaying a list of applications related to the second function; and
executing an application among the applications upon selection of the corresponding application.

8. The control method according to claim 1, wherein the performing the second function includes:
enabling an item for execution of an application installed in the in-vehicle multimedia terminal; and
executing an application corresponding to the item upon selection of the item.

9. The control method according to claim 1, wherein the first function includes receiving, processing, and displaying content operating in the mobile terminal.

10. The control method according to claim 1, wherein the step of performing the first function includes disabling content provided upon Bluetooth connection when the multimedia terminal is connected to the mobile terminal via USB.

11. The control method according to claim 9, further comprising transmitting a command corresponding to a predetermined input operation to the mobile terminal when the operation is input to a display screen upon display of the content.

12. An in-vehicle multimedia terminal comprising:
a display;
an interface configured to perform communication connection to a mobile terminal providing a plurality of services operating via separate protocols and an operating system (OS); and
a controller configured to recognize a type of the communication connected mobile terminal and the OS installed in the mobile terminal and to enable or disable a function for automatically searching for a first function associated with one of the plurality of services operating and the type of the communication connected mobile terminal when the mobile terminal provides the first function,
wherein the controller is configured to perform the first function by the in-vehicle multimedia terminal when the automatic search function is enabled and
to perform, by the in-vehicle multimedia terminal when the automatic search function is disabled, a second function associated with another one of the plurality of services operating and the type of the communication connected mobile terminal,
wherein the controller is configured to recognize the type of the communication connected mobile terminal by considering at least one of a vendor ID of the mobile terminal, device information of the mobile terminal, OS version information, and protocol information.

13. The in-vehicle multimedia terminal according to claim 12, wherein the controller is configured to perform the communication connection to the mobile terminal via USB or Bluetooth.

14. The in-vehicle multimedia terminal according to claim 12, wherein the controller is configured to perform the second function by the in-vehicle multimedia terminal when the mobile terminal does not provide the first function and the function for automatically searching for the first function is enabled.

15. The in-vehicle multimedia terminal according to claim 12, wherein the controller is configured to perform the second function by the in-vehicle multimedia terminal when the mobile terminal does not provide the first function and the function for automatically searching for the first function is disabled.

16. The in-vehicle multimedia terminal according to claim 12, wherein the controller is configured to enable the first function upon selection of a first function enabling item displayed on a UI screen and to disable the first function upon non-selection of the first function enabling item displayed on the predetermined UI screen.

17. The in-vehicle multimedia terminal according to claim 12, wherein the controller is configured to perform the first function, provided in the first mobile terminal, by the in-vehicle multimedia terminal.

18. The in-vehicle multimedia terminal according to claim 12, wherein the controller is configured to display a list of applications related to the second function and to execute an application among the applications upon selection of the corresponding application.

19. The in-vehicle multimedia terminal according to claim 12, wherein the controller is configured to enable an item for execution of an application installed in the in-vehicle multimedia terminal and to execute the application corresponding to the item upon selection of the item.

20. The in-vehicle multimedia terminal according to claim 12, wherein the first function includes receiving, processing, and displaying content operating in the mobile terminal.

21. The in-vehicle multimedia terminal according to claim 12, wherein the controller is configured to disable content provided upon Bluetooth connection when the multimedia terminal is connected to the mobile terminal via USB and performs the first function.

22. The in-vehicle multimedia terminal according to claim 20, wherein the controller is configured to transmit a command corresponding to an input operation to the mobile terminal when the operation is input to a display screen upon display of the content.

23. A non-transitory computer readable recording medium including a program to execute a control method of an in-vehicle multimedia terminal, wherein the control method comprises:

recognizing a type of a communication connected mobile terminal providing a plurality of services operating via separate protocols and an operating system (OS) and the OS installed in the mobile terminal;

enabling or disabling a function for automatically searching for a first function associated with one of the plurality of services operating and the type of the communication connected mobile terminal when the mobile terminal provides the first function;

performing the first function by the in-vehicle multimedia terminal when the search function is enabled; and performing by the in-vehicle multimedia terminal when the search function is disabled, a second function associated with another one of the plurality of services operating and the type of the communication connected mobile terminal, wherein the step of recognizing includes recognizing at least one of a vendor ID of the mobile terminal, device information of the mobile terminal, OS version information, and protocol information.

24. The recording medium according to claim 23, wherein the control method further comprises performing the second function by the in-vehicle multimedia terminal when the mobile terminal does not provide the first function and the multimedia terminal enables the function for automatically searching for the first function.

25. The recording medium according to claim 23, wherein the step of performing the second function includes:
displaying a list of applications related to the second function; and
executing an application among the applications upon selection of the corresponding application.

26. The recording medium according to claim 23, wherein the step of performing the second function includes:
enabling an item for execution of an application installed in the in-vehicle multimedia terminal; and
executing an application corresponding to the item upon selection of the item.

* * * * *